(12) United States Patent
Li et al.

(10) Patent No.: US 11,102,490 B2
(45) Date of Patent: Aug. 24, 2021

(54) COEFFICIENT SCANNING METHODS ON ADAPTIVE ANGLE MODE

(71) Applicant: TENCENT AMERICA LLC, Palo Alto, CA (US)

(72) Inventors: Yiming Li, Wuhan (CN); Xiaozhong Xu, State College, PA (US); Zhenzhong Chen, Wuhan (CN); Shan Liu, San Jose, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 0 days.

(21) Appl. No.: 16/718,480

(22) Filed: Dec. 18, 2019

(65) Prior Publication Data

US 2020/0213597 A1 Jul. 2, 2020

Related U.S. Application Data

(60) Provisional application No. 62/787,021, filed on Dec. 31, 2018.

(51) Int. Cl.
*H04N 19/11* (2014.01)
*H04N 19/129* (2014.01)
*H04N 19/159* (2014.01)
*H04N 19/176* (2014.01)

(52) U.S. Cl.
CPC .......... *H04N 19/159* (2014.11); *H04N 19/11* (2014.11); *H04N 19/129* (2014.11); *H04N 19/176* (2014.11)

(58) Field of Classification Search
None
See application file for complete search history.

(56) References Cited

U.S. PATENT DOCUMENTS

| 2009/0207234 | A1* | 8/2009 | Chen | H04N 5/23238 |
| | | | | 348/14.09 |
| 2011/0211036 | A1* | 9/2011 | Tran | G06F 3/005 |
| | | | | 348/14.08 |
| 2012/0099646 | A1* | 4/2012 | Coban | H04N 19/129 |
| | | | | 375/240.12 |
| 2012/0163455 | A1 | 6/2012 | Zheng et al. | |
| 2013/0058407 | A1* | 3/2013 | Sole Rojals | H04N 19/129 |
| | | | | 375/240.12 |

(Continued)

OTHER PUBLICATIONS

International Search Report dated Apr. 2, 2020, issued by the International Searching Authority in application No. PCT/US2019/068547.

(Continued)

*Primary Examiner* — Mohammad J Rahman
(74) *Attorney, Agent, or Firm* — Sughrue Mion, PLLC

(57) ABSTRACT

A method of controlling intra prediction for decoding or encoding of a video sequence, is by at least one processor and includes obtaining an index of an intra prediction mode of a current block of the video sequence, obtaining a coefficient scanning direction based on the obtained index, using a first look up table indicating a mapping between a plurality of indices of a plurality of intra prediction modes and respective coefficient scanning directions, and performing a coefficient scanning of the current block, based on the obtained coefficient scanning direction.

15 Claims, 12 Drawing Sheets

(56) References Cited

U.S. PATENT DOCUMENTS

| | | | |
|---|---|---|---|
| 2013/0188695 A1* | 7/2013 | Maani | H04N 19/70 |
| | | | 375/240.12 |
| 2013/0215964 A1 | 8/2013 | Yang et al. | |
| 2014/0300758 A1* | 10/2014 | Tran | H04N 5/225 |
| | | | 348/207.1 |
| 2015/0043634 A1* | 2/2015 | Lin | H04N 19/176 |
| | | | 375/240.12 |
| 2015/0365692 A1* | 12/2015 | Liu | H04N 19/186 |
| | | | 375/240.13 |
| 2017/0094314 A1* | 3/2017 | Zhao | H04N 19/122 |
| 2017/0374369 A1* | 12/2017 | Chuang | H04N 19/70 |
| 2018/0220146 A1* | 8/2018 | Liu | H04N 19/157 |
| 2019/0020881 A1* | 1/2019 | Filippov | H04N 19/176 |
| 2019/0166370 A1* | 5/2019 | Xiu | H04N 19/147 |

OTHER PUBLICATIONS

Written Opinion dated Apr. 2, 2020, issued by the International Searching Authority in application No. PCT/US2019/068547.

* cited by examiner

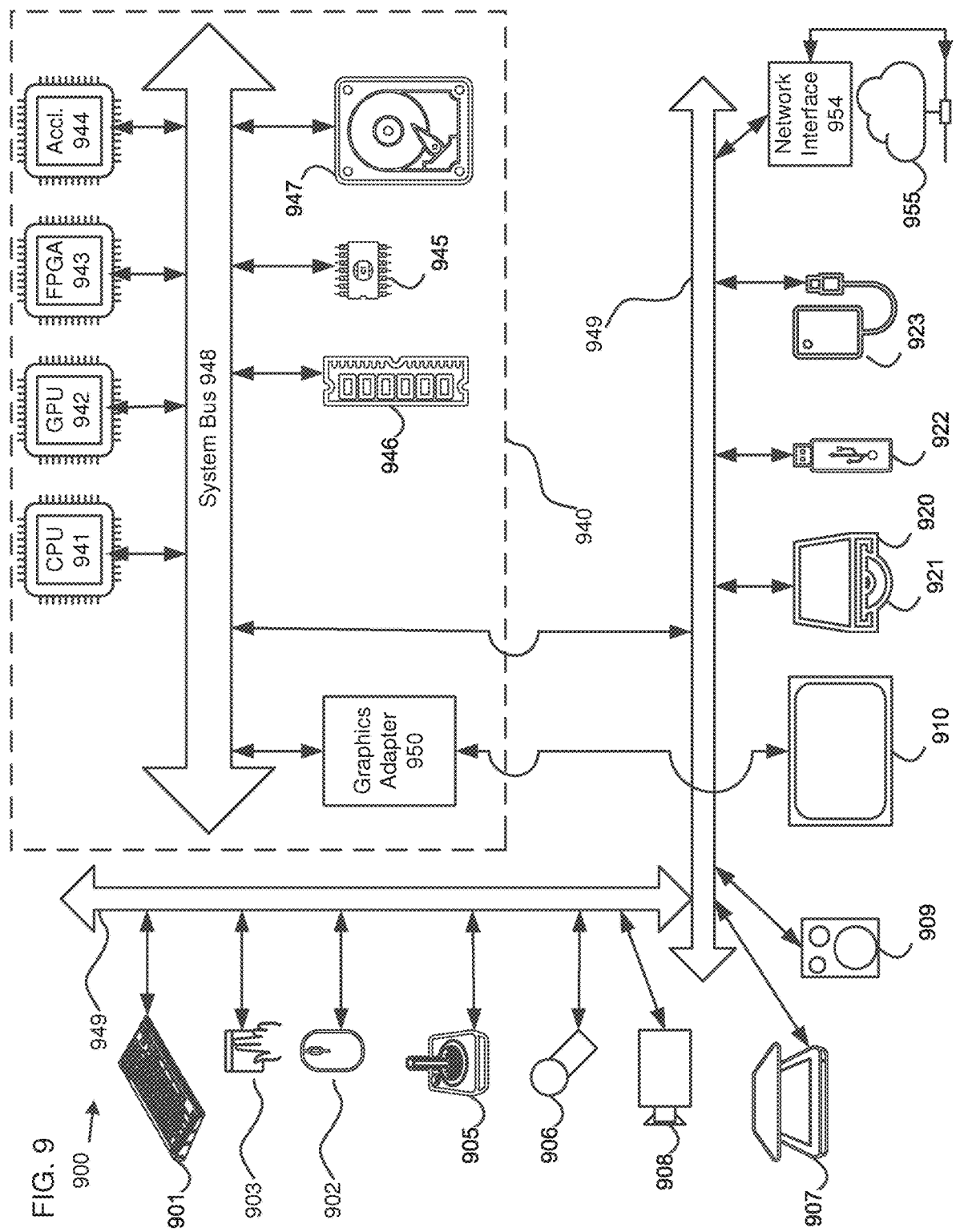

COEFFICIENT SCANNING METHODS ON ADAPTIVE ANGLE MODE

CROSS-REFERENCE TO RELATED APPLICATION

This application claims priority from U.S. Provisional Patent Application No. 62/787,021, filed on Dec. 31, 2018, in the U.S. Patent and Trademark Office, which is incorporated herein by reference in its entirety.

BACKGROUND

1. Field

Methods and apparatuses consistent with embodiments relate to video coding, and more particularly, coefficient scanning methods on an adaptive angle mode.

2. Description of Related Art

Intra prediction modes used in High Efficiency Video Coding (HEVC) and Versatile Video Coding (VVC) are illustrated in FIGS. 1A and 1B, respectively. In HEVC, mode 10 is a horizontal mode, mode 26 is a vertical mode, and mode 2, mode 18 and mode 34 are diagonal modes. An intra prediction scheme based on 65 directional modes has also been proposed to capture arbitrary edge directions presented in natural video, and this intra prediction scheme based on 65 directional modes is being studied for the development of VVC.

In FIG. 1A, in HEVC, mode 2 and 34 indicate the same prediction direction. In FIG. 1B, in VVC, mode 2 and 66 indicate the same prediction direction.

As shown in FIGS. 1A and 1B, all intra prediction modes are within 45 degrees in a top-right and a bottom-left direction, which are called conventional intra prediction modes in this document. Wide angles beyond the range of prediction directions covered by conventional intra prediction modes have been proposed, which are called wide angular intra prediction modes. Each wide-angular intra prediction direction is associated with one conventional intra prediction direction. Each wide-angular intra prediction direction and its associated intra prediction direction capture the same directionality, but use opposite sides of reference samples (left column or top row). Although a wide-angular prediction direction is a new direction, it may share a mode index with a conventional intra prediction direction that is opposite to it. A decoder can infer an accurate direction according to a ratio of a width and a height.

FIG. 1C illustrates the process for the hypothetical case of 33 HEVC directions and limiting the operation to two modes closest to the diagonal modes. In this example, if a block width is larger than a block height, mode 2 and mode 3 would become two modes right to mode 34 (shown as dashed lines top right in FIG. 1C).

In HEVC, three alternative scanning orders based on an intra prediction mode are designed. As shown in FIG. 1D, if a direction of an intra prediction mode is close to a horizontal direction, a horizontal scan (portion (b)) is used; if a direction of an intra prediction mode is close to a vertical direction, a vertical scan (portion (c)) is used; or a diagonal scan (portion (a)) is used.

SUMMARY

According to embodiments, a method of controlling intra prediction for decoding or encoding of a video sequence, is performed by at least one processor and includes obtaining an index of an intra prediction mode of a current block of the video sequence, obtaining a coefficient scanning direction based on the obtained index, using a first look up table indicating a mapping between a plurality of indices of a plurality of intra prediction modes and respective coefficient scanning directions, and performing a coefficient scanning of the current block, based on the obtained coefficient scanning direction.

According to embodiments, an apparatus for controlling intra prediction for decoding or encoding of a video sequence, includes at least one memory configured to store computer program code, and at least one processor configured to access the at least one memory and operate according to the computer program code. The computer program code includes first obtaining code configured to cause the at least one processor to obtain an index of an intra prediction mode of a current block of the video sequence, and second obtaining code configured to cause the at least one processor to obtain a coefficient scanning direction based on the obtained index, using a first look up table indicating a mapping between a plurality of indices of a plurality of intra prediction modes and respective coefficient scanning directions. The computer program code further includes performing code configured to cause the at least one processor to perform a coefficient scanning of the current block, based on the obtained coefficient scanning direction.

According to embodiments, a non-transitory computer-readable storage medium stores instructions that cause at least one processor to obtain an index of an intra prediction mode of a current block of a video sequence, obtain a coefficient scanning direction based on the obtained index, using a first look up table indicating a mapping between a plurality of indices of a plurality of intra prediction modes and respective coefficient scanning directions, and perform a coefficient scanning of the current block, based on the obtained coefficient scanning direction.

BRIEF DESCRIPTION OF THE DRAWINGS

FIG. 9 is a diagram of a computer system suitable for implementing embodiments.

DETAILED DESCRIPTION

Figure 2:
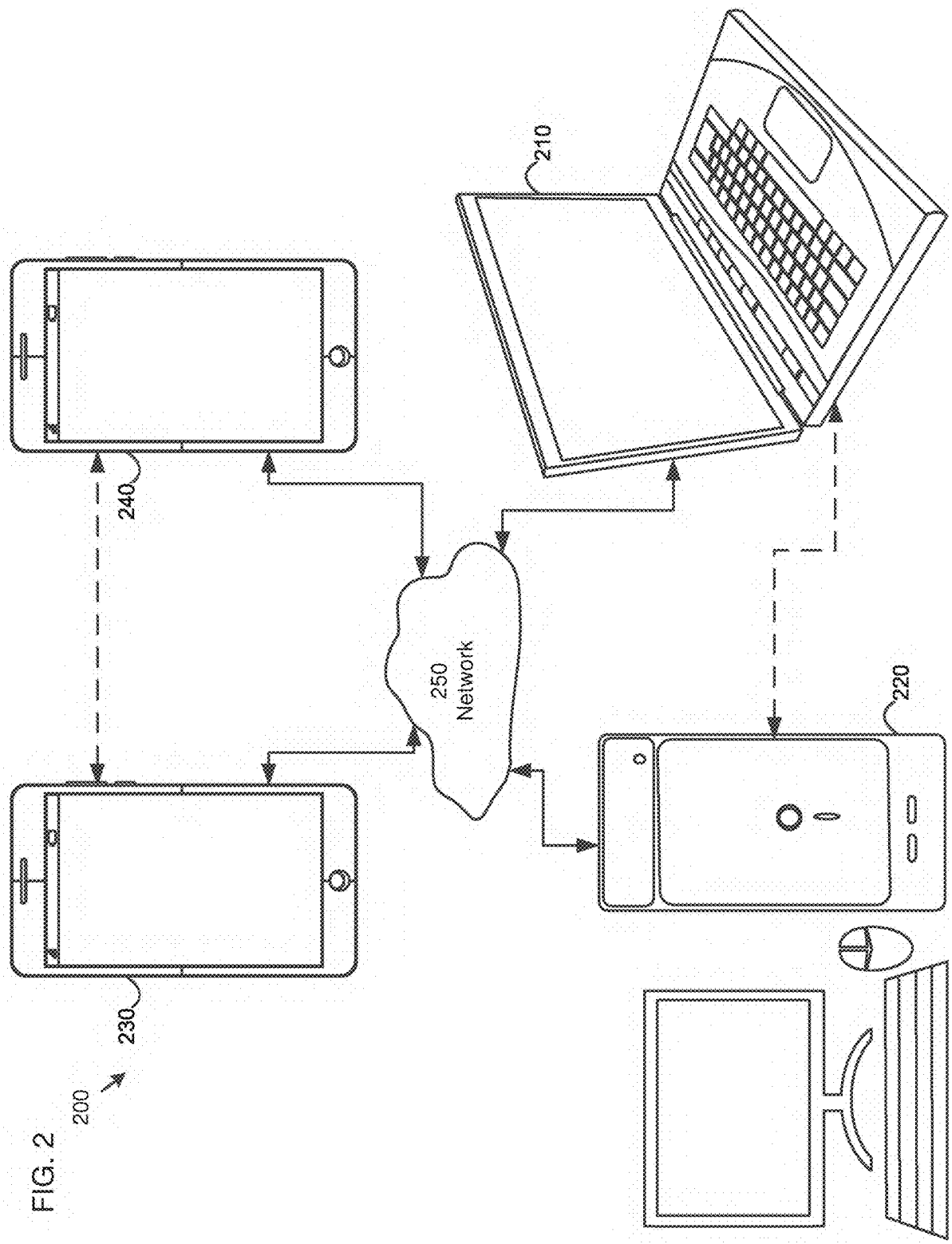
FIG. 2 is a simplified block diagram of a communication system according to embodiments.

FIG. 2 is a simplified block diagram of a communication system (200) according to embodiments. The communication system (200) may include at least two terminals (210-220) interconnected via a network (250). For unidirectional transmission of data, a first terminal (210) may code video data at a local location for transmission to the other terminal (220) via the network (250). The second terminal (220) may receive the coded video data of the other terminal from the network (250), decode the coded data and display the recovered video data. Unidirectional data transmission may be common in media serving applications and the like.

FIG. 2 illustrates a second pair of terminals (230, 240) provided to support bidirectional transmission of coded video that may occur, for example, during videoconferencing. For bidirectional transmission of data, each terminal (230, 240) may code video data captured at a local location for transmission to the other terminal via the network (250). Each terminal (230, 240) also may receive the coded video data transmitted by the other terminal, may decode the coded data and may display the recovered video data at a local display device.

In FIG. 2, the terminals (210-240) may be illustrated as servers, personal computers and smart phones but the principles of embodiments are not so limited. Embodiments find application with laptop computers, tablet computers, media players and/or dedicated video conferencing equipment. The network (250) represents any number of networks that convey coded video data among the terminals (210-240), including for example wireline and/or wireless communication networks. The communication network (250) may exchange data in circuit-switched and/or packet-switched channels. Representative networks include telecommunications networks, local area networks, wide area networks and/or the Internet. For the purposes of the present discussion, the architecture and topology of the network (250) may be immaterial to the operation of embodiments unless explained herein below.

Figure 3:
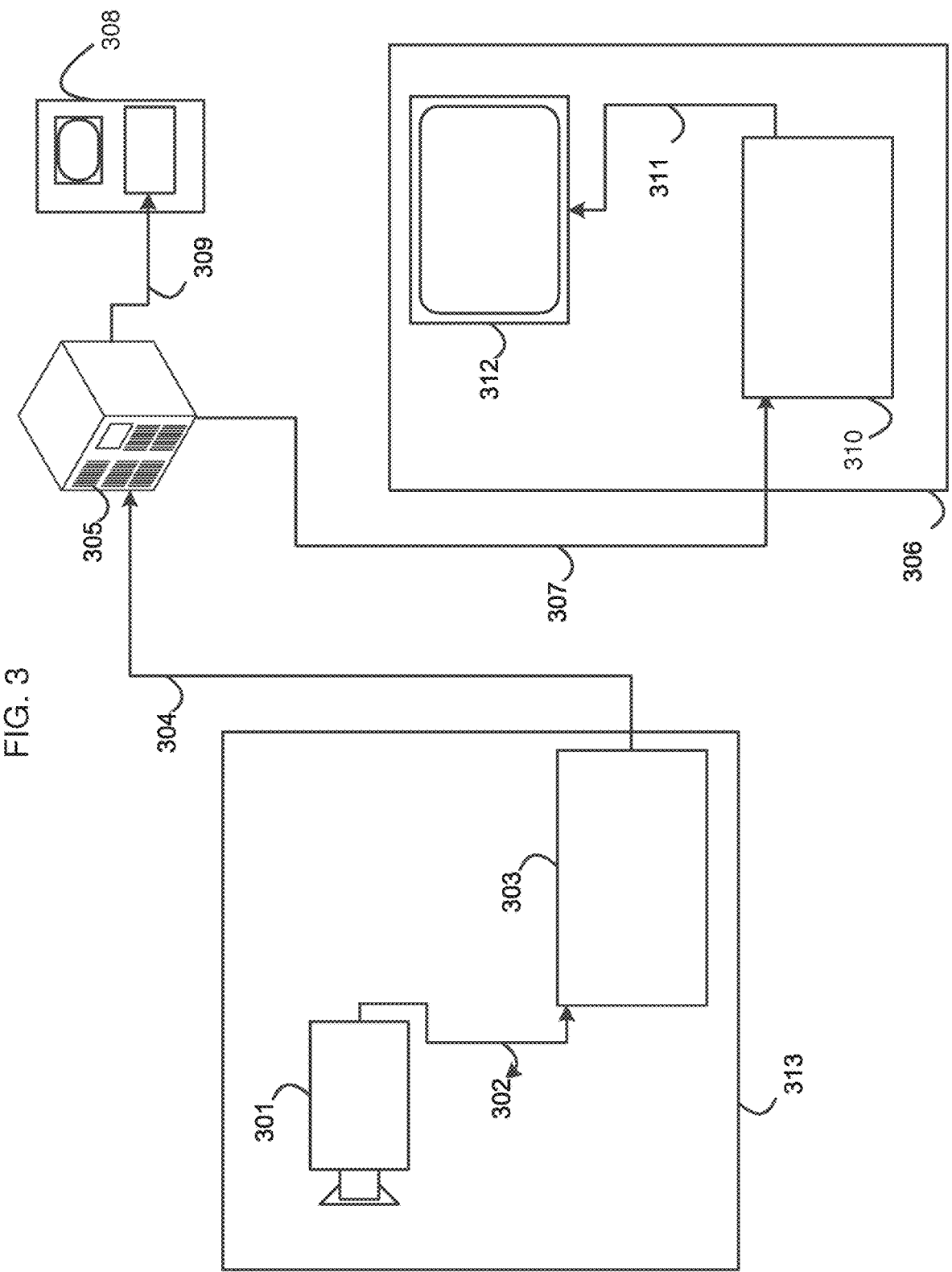
FIG. 3 is a diagram of a placement of a video encoder and a video decoder in a streaming environment, according to embodiments.

FIG. 3 is a diagram of a placement of a video encoder and a video decoder in a streaming environment, according to embodiments. The disclosed subject matter can be equally applicable to other video enabled applications, including, for example, video conferencing, digital TV, storing of compressed video on digital media including CD, DVD, memory stick and the like, and so on.

A streaming system may include a capture subsystem (313) that can include a video source (301), for example a digital camera, creating, for example, an uncompressed video sample stream (302). That sample stream (302), depicted as a bold line to emphasize a high data volume when compared to encoded video bitstreams, can be processed by an encoder (303) coupled to the camera (301). The encoder (303) can include hardware, software, or a combination thereof to enable or implement aspects of the disclosed subject matter as described in more detail below. The encoded video bitstream (304), depicted as a thin line to emphasize the lower data volume when compared to the sample stream, can be stored on a streaming server (305) for future use. One or more streaming clients (306, 308) can access the streaming server (305) to retrieve copies (307, 309) of the encoded video bitstream (304). A client (306) can include a video decoder (310), which decodes the incoming copy of the encoded video bitstream (307) and creates an outgoing video sample stream (311) that can be rendered on a display (312) or other rendering device (not depicted). In some streaming systems, the video bitstreams (304, 307, 309) can be encoded according to certain video coding/compression standards. Examples of those standards include ITU-T Recommendation H.265. Under development is a video coding standard informally known as VVC. The disclosed subject matter may be used in the context of VVC.

Figure 4:
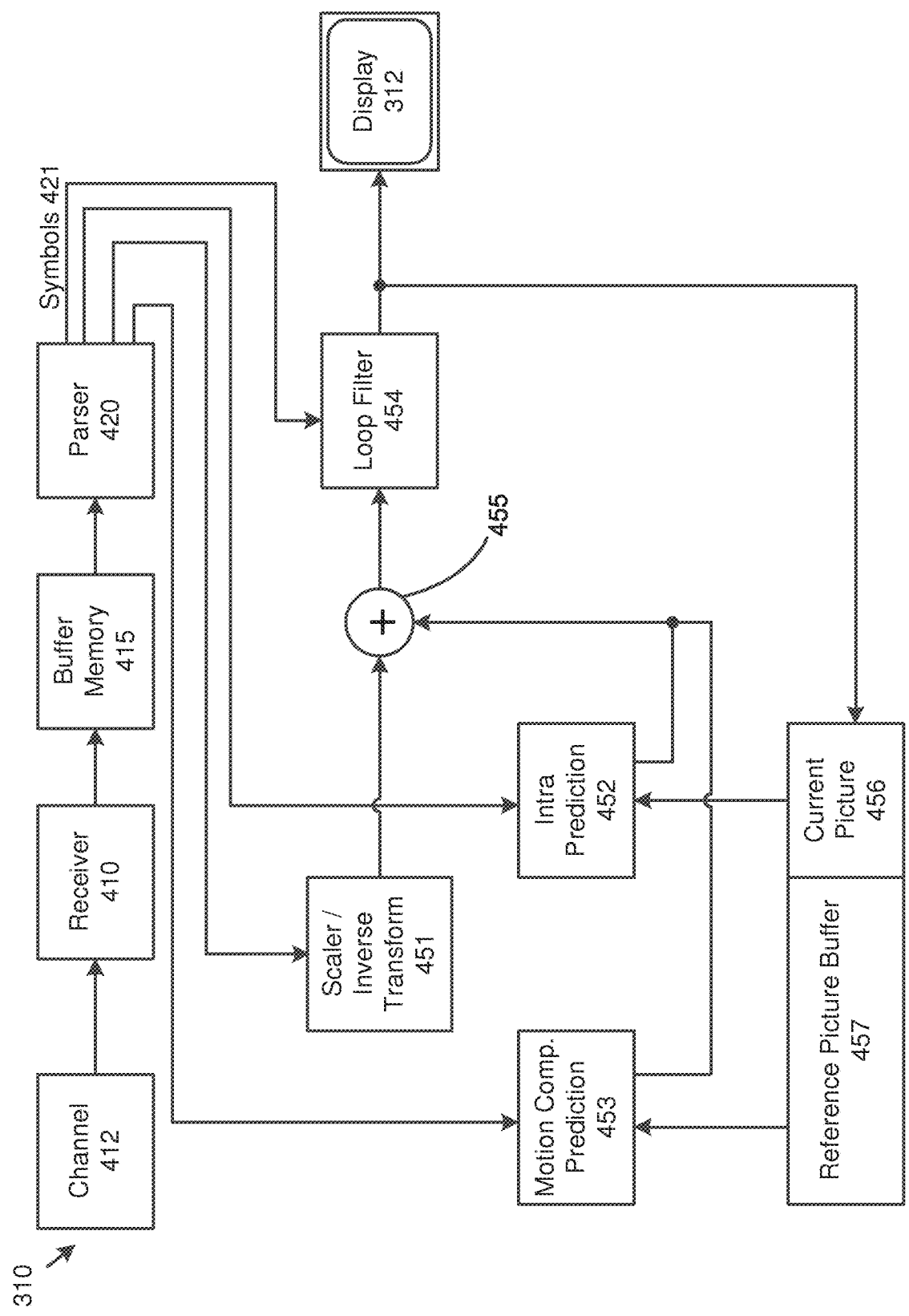
FIG. 4 is a functional block diagram of a video decoder according to embodiments.

FIG. 4 is a functional block diagram of a video decoder (310) according to embodiments.

A receiver (410) may receive one or more codec video sequences to be decoded by the decoder (310); in the same or embodiments, one coded video sequence at a time, where the decoding of each coded video sequence is independent from other coded video sequences. The coded video sequence may be received from a channel (412), which may be a hardware/software link to a storage device, which stores the encoded video data. The receiver (410) may receive the encoded video data with other data, for example, coded audio data and/or ancillary data streams, that may be forwarded to their respective using entities (not depicted). The receiver (410) may separate the coded video sequence from the other data. To combat network jitter, a buffer memory (415) may be coupled in between receiver (410) and entropy decoder/parser (420) ("parser" henceforth). When receiver (410) is receiving data from a store/forward device of sufficient bandwidth and controllability, or from an isosychronous network, the buffer (415) may not be needed, or can be small. For use on best effort packet networks such as the Internet, the buffer (415) may be required, can be comparatively large and can advantageously of adaptive size.

The video decoder (310) may include a parser (420) to reconstruct symbols (421) from the entropy coded video sequence. Categories of those symbols include information used to manage operation of the decoder (310), and potentially information to control a rendering device such as a display (312) that is not an integral part of the decoder but can be coupled to it, as was shown in FIG. 4. The control information for the rendering device(s) may be in the form of Supplementary Enhancement Information (SEI messages) or Video Usability Information (VUI) parameter set fragments (not depicted). The parser (420) may parse/entropy-decode the coded video sequence received. The coding of the coded video sequence can be in accordance with a video coding technology or standard, and can follow principles well known to a person skilled in the art, including variable length coding, Huffman coding, arithmetic coding with or without context sensitivity, and so forth. The parser (420) may extract from the coded video sequence, a set of subgroup parameters for at least one of the subgroups of pixels in the video decoder, based upon at least one parameters corresponding to the group. Subgroups can include Groups of Pictures (GOPs), pictures, tiles, slices, macroblocks, Coding Units (CUs), blocks, Transform Units (TUs), Prediction Units (PUs) and so forth. The entropy decoder/parser may also extract from the coded video sequence information such as transform coefficients, quantizer parameter (QP) values, motion vectors, and so forth.

The parser (420) may perform entropy decoding/parsing operation on the video sequence received from the buffer (415), so to create symbols (421). The parser (420) may receive encoded data, and selectively decode particular symbols (421). Further, the parser (420) may determine whether the particular symbols (421) are to be provided to a Motion Compensation Prediction unit (453), a scaler/inverse transform unit (451), an Intra Prediction unit (452), or a loop filter unit (454).

Reconstruction of the symbols (421) can involve multiple different units depending on the type of the coded video picture or parts thereof (such as: inter and intra picture, inter and intra block), and other factors. Which units are involved, and how, can be controlled by the subgroup control information that was parsed from the coded video sequence by the parser (420). The flow of such subgroup control information between the parser (420) and the multiple units below is not depicted for clarity.

Beyond the functional blocks already mentioned, decoder (310) can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

A first unit is the scaler/inverse transform unit (451). The scaler/inverse transform unit (451) receives quantized transform coefficient as well as control information, including which transform to use, block size, quantization factor, quantization scaling matrices, etc. as symbol(s) (421) from the parser (420). It can output blocks comprising sample values that can be input into aggregator (455).

In some cases, the output samples of the scaler/inverse transform (451) can pertain to an intra coded block; that is: a block that is not using predictive information from previously reconstructed pictures, but can use predictive information from previously reconstructed parts of the current picture. Such predictive information can be provided by an intra picture prediction unit (452). In some cases, the intra picture prediction unit (452) generates a block of the same size and shape of the block under reconstruction, using surrounding already reconstructed information fetched from the current (partly reconstructed) picture (456). The aggregator (455), in some cases, adds, on a per sample basis, the prediction information the intra prediction unit (452) has generated to the output sample information as provided by the scaler/inverse transform unit (451).

In other cases, the output samples of the scaler/inverse transform unit (451) can pertain to an inter coded, and potentially motion compensated block. In such a case, a Motion Compensation Prediction unit (453) can access reference picture memory (457) to fetch samples used for prediction. After motion compensating the fetched samples in accordance with the symbols (421) pertaining to the block, these samples can be added by the aggregator (455) to the output of the scaler/inverse transform unit (in this case called the residual samples or residual signal) so to generate output sample information. The addresses within the reference picture memory form where the motion compensation unit fetches prediction samples can be controlled by motion vectors, available to the motion compensation unit in the form of symbols (421) that can have, for example X, Y, and reference picture components. Motion compensation also can include interpolation of sample values as fetched from the reference picture memory when sub-sample exact motion vectors are in use, motion vector prediction mechanisms, and so forth.

The output samples of the aggregator (455) can be subject to various loop filtering techniques in the loop filter unit (454). Video compression technologies can include in-loop filter technologies that are controlled by parameters included in the coded video bitstream and made available to the loop filter unit (454) as symbols (421) from the parser (420), but can also be responsive to meta-information obtained during the decoding of previous (in decoding order) parts of the coded picture or coded video sequence, as well as responsive to previously reconstructed and loop-filtered sample values.

The output of the loop filter unit (454) can be a sample stream that can be output to the render device (312) as well as stored in the reference picture memory (456) for use in future inter-picture prediction.

Certain coded pictures, once fully reconstructed, can be used as reference pictures for future prediction. Once a coded picture is fully reconstructed and the coded picture has been identified as a reference picture (by, for example, parser (420)), the current reference picture (456) can become part of the reference picture buffer (457), and a fresh current picture memory can be reallocated before commencing the reconstruction of the following coded picture.

The video decoder (310) may perform decoding operations according to a predetermined video compression technology that may be documented in a standard, such as ITU-T Rec. H.265. The coded video sequence may conform to a syntax specified by the video compression technology or standard being used, in the sense that it adheres to the syntax of the video compression technology or standard, as specified in the video compression technology document or standard and specifically in the profiles document therein. Also necessary for compliance can be that the complexity of the coded video sequence is within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

In embodiments, the receiver (410) may receive additional (redundant) data with the encoded video. The additional data may be included as part of the coded video sequence(s). The additional data may be used by the video decoder (310) to properly decode the data and/or to more accurately reconstruct the original video data. Additional data can be in the form of, for example, temporal, spatial, or signal-to-noise ratio (SNR) enhancement layers, redundant slices, redundant pictures, forward error correction codes, and so on.

Figure 5:
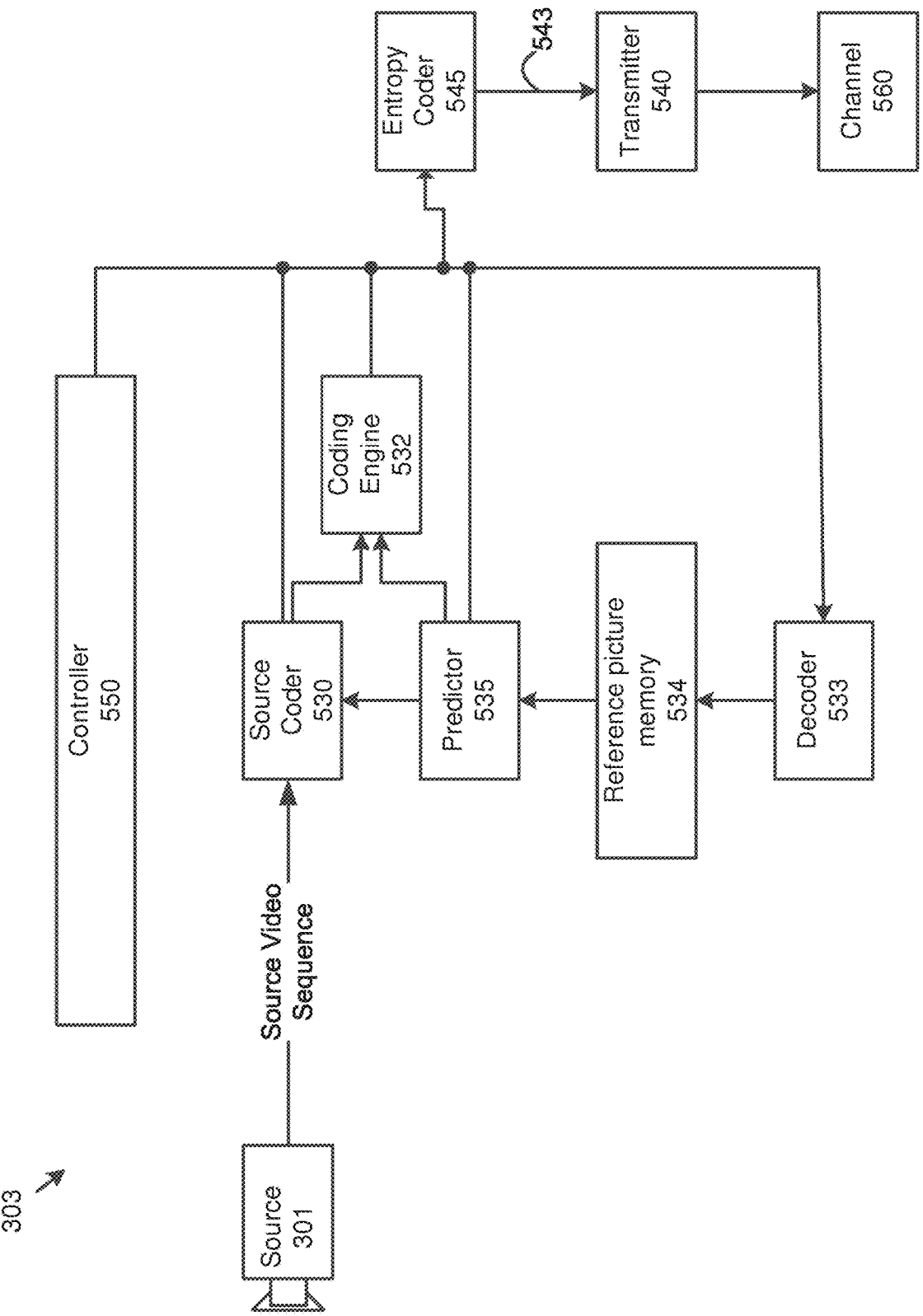
FIG. 5 is a functional block diagram of a video encoder according to embodiments.

FIG. 5 is a functional block diagram of a video encoder (303) according to embodiments.

The encoder (303) may receive video samples from a video source (301) (that is not part of the encoder) that may capture video image(s) to be coded by the encoder (303).

The video source (301) may provide the source video sequence to be coded by the encoder (303) in the form of a digital video sample stream that can be of any suitable bit depth (for example: 8 bit, 10 bit, 12 bit, . . . ), any colorspace (for example, BT.601 Y CrCB, RGB, . . . ) and any suitable sampling structure (for example Y CrCb 4:2:0, Y CrCb 4:4:4). In a media serving system, the video source (301) may be a storage device storing previously prepared video. In a videoconferencing system, the video source (301) may be a camera that captures local image information as a video sequence. Video data may be provided as a plurality of individual pictures that impart motion when viewed in sequence. The pictures themselves may be organized as a spatial array of pixels, wherein each pixel can comprise one or more samples depending on the sampling structure, color space, etc. in use. A person skilled in the art can readily understand the relationship between pixels and samples. The description below focuses on samples.

According to embodiments, the encoder (303) may code and compress the pictures of the source video sequence into a coded video sequence (543) in real time or under any other time constraints as required by the application. Enforcing appropriate coding speed is one function of Controller (550). Controller controls other functional units as described below and is functionally coupled to these units. The coupling is not depicted for clarity. Parameters set by controller can include rate control related parameters (picture skip, quantizer, lambda value of rate-distortion optimization techniques, . . . ), picture size, group of pictures (GOP) layout, maximum motion vector search range, and so forth. A person skilled in the art can readily identify other functions of controller (550) as they may pertain to video encoder (303) optimized for a certain system design.

Some video encoders operate in what a person skilled in the art readily recognizes as a "coding loop." As an oversimplified description, a coding loop can consist of the encoding part of an encoder (530) ("source coder" henceforth) (responsible for creating symbols based on an input picture to be coded, and a reference picture(s)), and a (local) decoder (533) embedded in the encoder (303) that reconstructs the symbols to create the sample data that a (remote) decoder also would create (as any compression between symbols and coded video bitstream is lossless in the video compression technologies considered in the disclosed subject matter). That reconstructed sample stream is input to the reference picture memory (534). As the decoding of a symbol stream leads to bit-exact results independent of decoder location (local or remote), the reference picture buffer content is also bit exact between local encoder and remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is well known to a person skilled in the art.

The operation of the "local" decoder (533) can be the same as of a "remote" decoder (310), which has already been described in detail above in conjunction with FIG. 4. Briefly referring also to FIG. 4, however, as symbols are available and en/decoding of symbols to a coded video sequence by entropy coder (545) and parser (420) can be lossless, the entropy decoding parts of decoder (310), including channel (412), receiver (410), buffer (415), and parser (420) may not be fully implemented in local decoder (533).

An observation that can be made at this point is that any decoder technology except the parsing/entropy decoding that is present in a decoder also necessarily needs to be present, in substantially identical functional form, in a corresponding encoder. The description of encoder technologies can be abbreviated as they are the inverse of the comprehensively described decoder technologies. Only in certain areas a more detail description is required and provided below.

As part of its operation, the source coder (530) may perform motion compensated predictive coding, which codes an input frame predictively with reference to one or more previously-coded frames from the video sequence that were designated as "reference frames." In this manner, the coding engine (532) codes differences between pixel blocks of an input frame and pixel blocks of reference frame(s) that may be selected as prediction reference(s) to the input frame.

The local video decoder (533) may decode coded video data of frames that may be designated as reference frames, based on symbols created by the source coder (530). Operations of the coding engine (532) may advantageously be lossy processes. When the coded video data may be decoded at a video decoder (not shown in FIG. 4), the reconstructed video sequence typically may be a replica of the source video sequence with some errors. The local video decoder (533) replicates decoding processes that may be performed by the video decoder on reference frames and may cause reconstructed reference frames to be stored in the reference picture cache (534). In this manner, the encoder (303) may store copies of reconstructed reference frames locally that have common content as the reconstructed reference frames that will be obtained by a far-end video decoder (absent transmission errors).

The predictor (535) may perform prediction searches for the coding engine (532). That is, for a new frame to be coded, the predictor (535) may search the reference picture memory (534) for sample data (as candidate reference pixel blocks) or certain metadata such as reference picture motion vectors, block shapes, and so on, that may serve as an appropriate prediction reference for the new pictures. The predictor (535) may operate on a sample block-by-pixel block basis to find appropriate prediction references. In some cases, as determined by search results obtained by the predictor (535), an input picture may have prediction references drawn from multiple reference pictures stored in the reference picture memory (534).

The controller (550) may manage coding operations of the video coder (530), including, for example, setting of parameters and subgroup parameters used for encoding the video data.

Output of all aforementioned functional units may be subjected to entropy coding in the entropy coder (545). The entropy coder translates the symbols as generated by the various functional units into a coded video sequence, by loss-less compressing the symbols according to technologies known to a person skilled in the art as, for example Huffman coding, variable length coding, arithmetic coding, and so forth.

The transmitter (540) may buffer the coded video sequence(s) as created by the entropy coder (545) to prepare it for transmission via a communication channel (560), which may be a hardware/software link to a storage device that may store the encoded video data. The transmitter (540) may merge coded video data from the video coder (530) with other data to be transmitted, for example, coded audio data and/or ancillary data streams (sources not shown).

The controller (550) may manage operation of the encoder (303). During coding, the controller (550) may assign to each coded picture a certain coded picture type, which may affect the coding techniques that may be applied to the respective picture. For example, pictures often may be assigned as one of the following frame types:

An Intra Picture (I picture) may be one that may be coded and decoded without using any other frame in the sequence as a source of prediction. Some video codecs allow for different types of Intra pictures, including, for example Independent Decoder Refresh Pictures. A person skilled in the art is aware of those variants of I pictures and their respective applications and features.

A Predictive picture (P picture) may be one that may be coded and decoded using intra prediction or inter prediction using at most one motion vector and reference index to predict the sample values of each block.

A Bi-directionally Predictive Picture (B Picture) may be one that may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded non-predictively, via spatial prediction or via temporal prediction with reference to one previously coded reference pictures. Blocks of B pictures may be coded non-predictively, via spatial prediction or via temporal prediction with reference to one or two previously coded reference pictures.

The video coder (303) may perform coding operations according to a predetermined video coding technology or standard, such as ITU-T Rec. H.265. In its operation, the video coder (303) may perform various compression operations, including predictive coding operations that exploit temporal and spatial redundancies in the input video sequence. The coded video data, therefore, may conform to a syntax specified by the video coding technology or standard being used.

In embodiments, the transmitter (540) may transmit additional data with the encoded video. The video coder (530) may include such data as part of the coded video sequence. Additional data may comprise temporal/spatial/SNR enhancement layers, other forms of redundant data such as redundant pictures and slices, Supplementary Enhancement Information (SEI) messages, Visual Usability Information (VUI) parameter set fragments, and so on.

Coefficient scanning methods on an adaptive angle mode will now be described in detail. Embodiments include a process for choosing a coefficient scanning direction (e.g., a horizontal scan, a vertical scan and a diagonal scan) for a wide angle mode.

Method 1

In embodiments, a coefficient scanning method is chosen based on both an intra prediction mode index and its actual direction. If a current intra prediction mode is inferred as a wide angle mode, a coefficient scanning method is decided by a wide angle direction of the wide angle mode instead of an intra prediction mode index of the wide angle mode.

In examples, a look up table LUT1 is defined for indicating a correlation of each intra prediction mode index and a coefficient scanning direction, where a number of indices of the look up table LUT1 is more than a number of intra prediction modes.

Figure 1A:
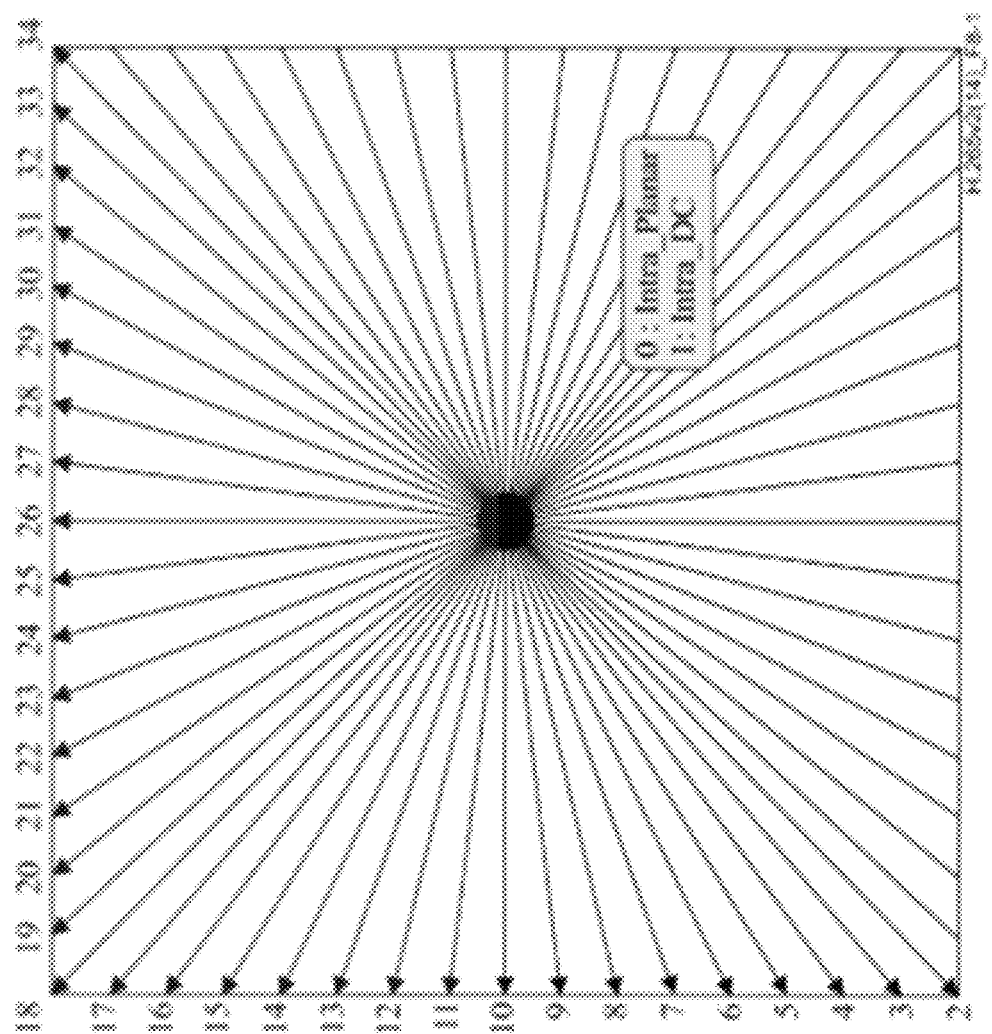
FIG. 1A is a diagram of 35 intra prediction modes in HEVC.
Figure 1B:
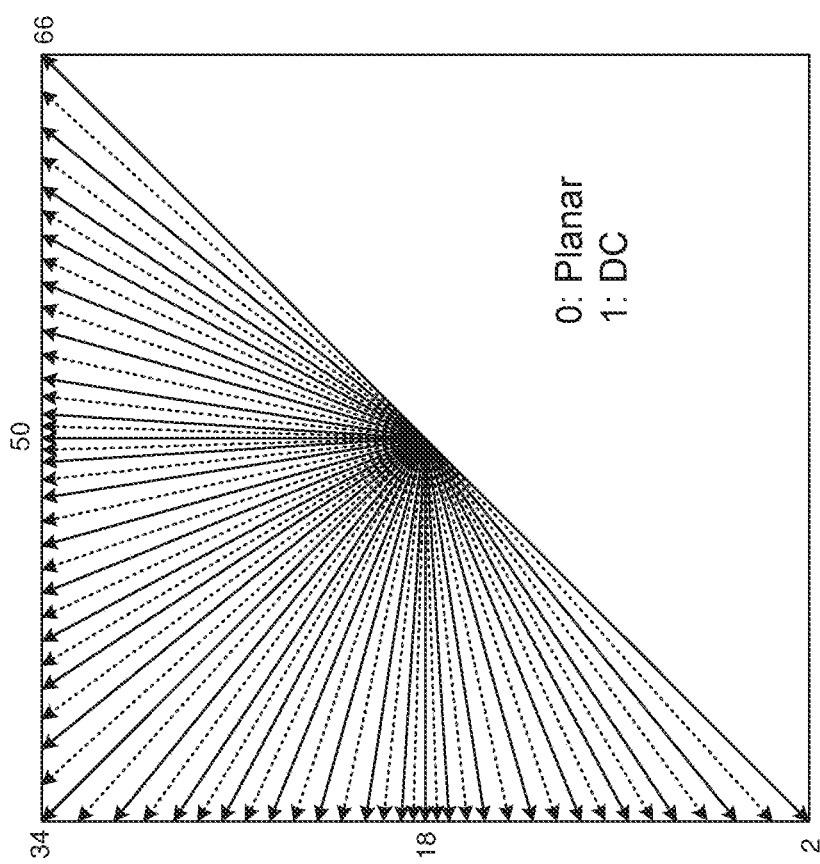
FIG. 1B is a diagram of 67 intra prediction modes in VVC.
Figure 1C:
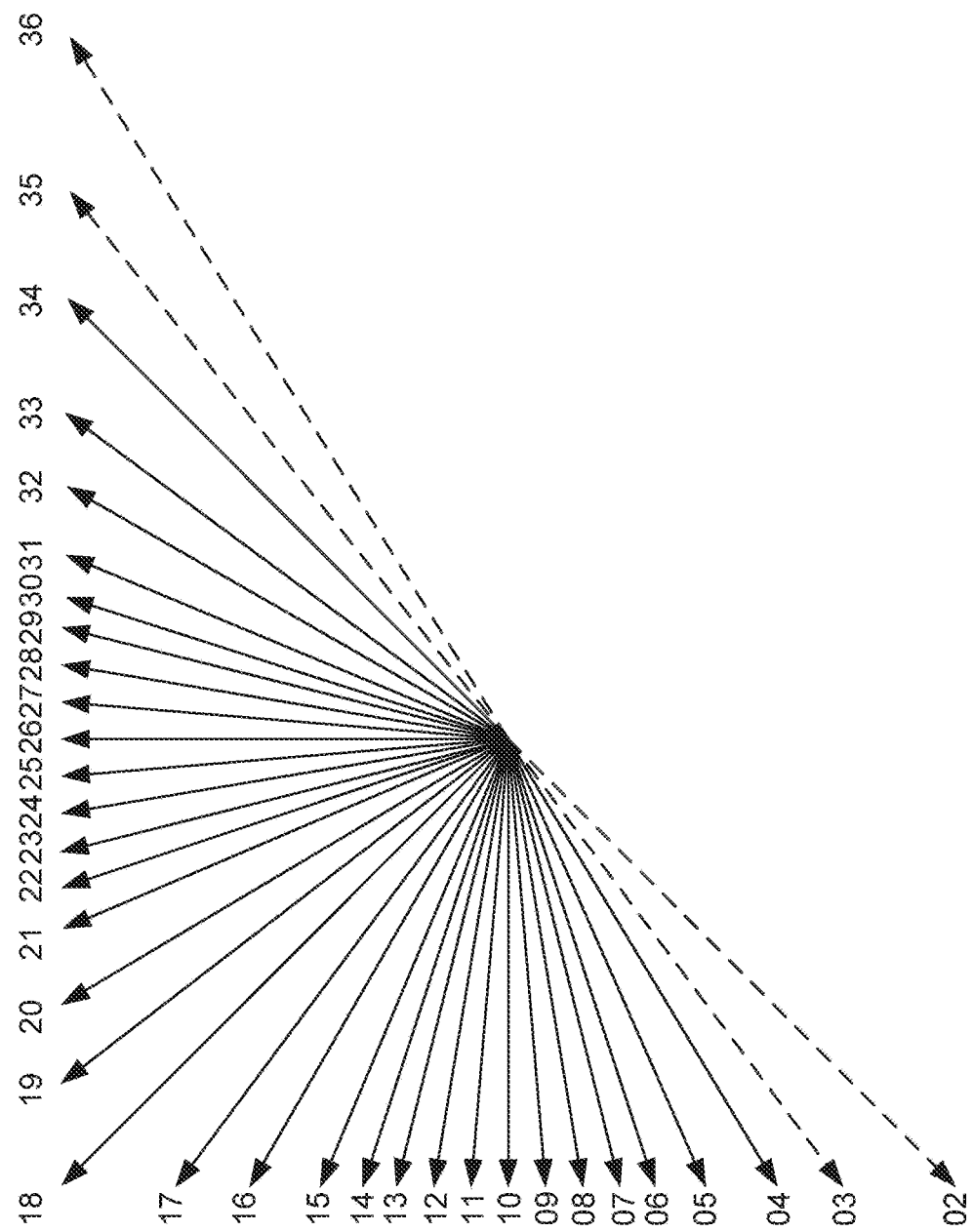
FIG. 1C is a diagram of signaled modes and associated wide angular modes.
Figure 1D:
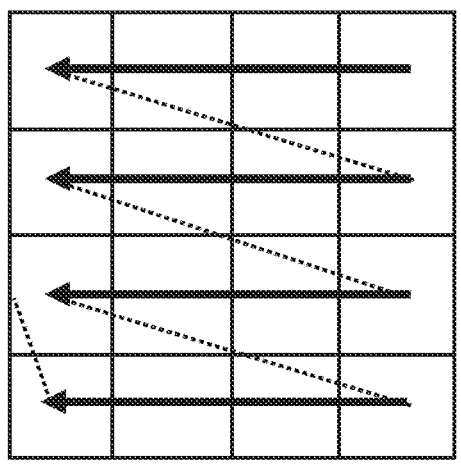
FIG. 1D is a diagram of coefficient scanning methods.
Figure 1D:
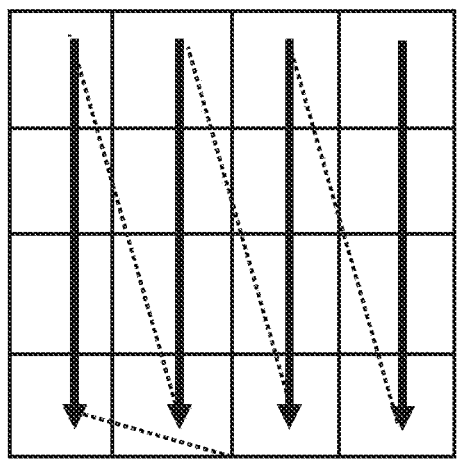
Figure 1D:
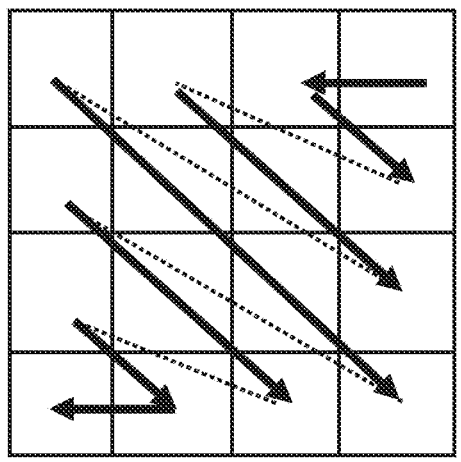

In examples, an index of a wide angle mode can be derived separately from an index of a conventional intra prediction mode, so that each mode index in the look up table LUT1 has a single coefficient scanning direction. In detail, in the look up table LUT1, an index of a conventional intra prediction mode (a non-wide angle mode) with the smallest index in intra prediction mode coding is A, e.g., mode 2 in FIGS. 1A and 1B. However, in the look up table LUT1, an index of a wide angle mode with the smallest index is B+1, where B is an index of a conventional intra prediction mode (a non-wide angle mode) with the largest index in the intra prediction mode coding, e.g., mode 34 in FIG. 1A or mode 66 in FIG. 1B.

Method 2

In embodiments, a coefficient scanning method is chosen based on both an intra prediction mode index and its actual direction. If a current intra prediction mode is inferred as a wide angle mode, a coefficient scanning method is decided by a wide angle direction of the wide angle mode instead of an intra prediction mode index of the wide angle mode.

In examples, two lookup tables LUT1, LUT2 are designed for indicating a correlation of each intra prediction mode index and a coefficient scanning direction. The look up table LUT1 stores a mapping between each intra prediction mode index and a scan order or coefficient scanning direction, for non-wide angle modes, and the look up table LUT2 stores a mapping between each intra prediction mode index and a scan order or coefficient scanning direction, for wide angle modes. A number of indices of the look up table LUT1 is the same as a number of intra prediction modes.

In examples, a parameter that indicates whether an intra prediction mode is a wide angle mode is used for choosing an appropriate look up table from the look up tables LUT1 and LUT2.

Method 3

In embodiments, a coefficient scanning method is chosen based on only an intra prediction mode index. However, considering a current intra prediction mode may be inferred as a wide angle mode (i.e., intra prediction mode indices may be shared by both regular intra prediction directions and inferred wide angle directions), a larger number of horizontal or vertical scanning directions is respectively assigned to intra prediction mode indices in this method than in a conventional definition.

In examples, a look up table LUT1 is defined for indicating a correlation of each intra prediction mode and a coefficient scanning direction, where a number of the indices of the look up table LUT1 is the same as a number of intra prediction modes.

In examples, a larger number of intra prediction mode indices is assigned to use a horizontal or vertical scanning direction instead of a diagonal scanning direction. Such intra prediction mode indices may be shared between regular intra prediction modes and wide angle modes, and are near top right and bottom left diagonal directions. These intra prediction mode indices may be assigned to use the horizontal or vertical scanning direction because they may be used to represent the wide angle modes.

In particular, the look up table LUT1 for 65 angular intra prediction modes can respectively include the following coefficient scanning directions, where the angular intra prediction modes start from a third entry (mode 2):

{X, X, DIA, DIA, DIA, DIA, HOR, HOR, HOR, HOR, HOR, HOR, HOR, HOR, HOR, HOR, HOR, HOR, HOR, HOR, HOR, HOR, HOR, HOR, HOR, HOR, HOR, HOR, HOR, HOR, HOR, HOR, HOR, DIA, DIA, DIA, DIA, DIA, DIA, DIA, VER, VER, VER, VER, VER, VER, VER, VER, VER, VER, VER, VER, VER, VER, VER, VER, VER, VER, VER, VER, VER, VER, VER, DIA, DIA, DIA, DIA}, where X indicates a variable scanning direction, DIA indicates a diagonal scanning direction, HOR indicates a horizontal scanning direction and VER indicates a vertical scanning direction.

First and second entries in the look up table LUT1 represent variable scanning directions for two non-angular intra prediction modes (DC and Planar). For other intra prediction coding systems with different angular/non-angular intra prediction mode assignments, a table similar to the look up table LUT1 may be derived using the look up table LUT1.

In look up table LUT1 above, there are 15 DIA scanning modes, 25 HOR scanning modes and 25 VER scanning modes. Other numbers of the scanning modes may be considered, but a number of the DIA scanning modes may set to be less (e.g., by at least 6) than those of the HOR scanning modes and the VER scanning modes.

The look up table LUT1 can be defined based on other directional modes. When compared with the 65 angular intra prediction modes, if some of these directional modes do not exist and/or other directional modes are added, corresponding indices in the look up table LUT1 can also be removed and/or added.

The lookup table LUT1 that assigns a larger number of intra prediction modes to use a horizontal or vertical scanning method rather than a diagonal scanning method can also be used even when wide angle modes or adaptive modes do not exist.

Figure 6:
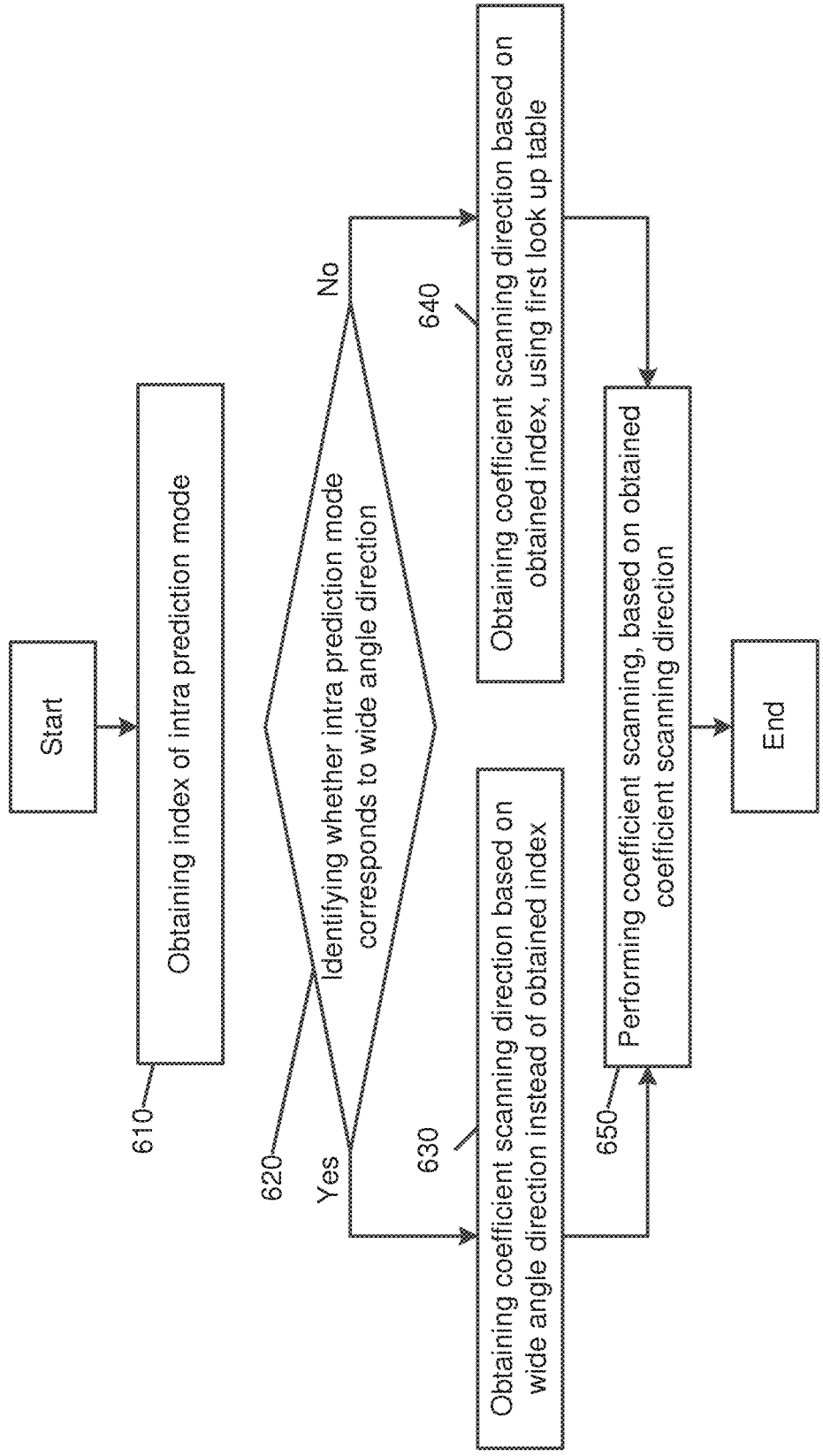
FIG. 6 is a flowchart illustrating a method of controlling intra prediction for decoding or encoding of a video sequence, according to embodiments.

FIG. 6 is a flowchart illustrating a method (600) of controlling intra prediction for decoding or encoding of a video sequence, according to embodiments. In some implementations, one or more process blocks of FIG. 6 may be performed by the decoder (310). In some implementations, one or more process blocks of FIG. 6 may be performed by another device or a group of devices separate from or including the decoder (310), such as the encoder (303).

Referring to FIG. 6, in a first block (610), the method (600) includes obtaining an index of an intra prediction mode of a current block of the video sequence.

In a second block (620), the method (600) includes identifying whether the intra prediction mode corresponds to a wide angle direction.

In a third block (630), the method (600) includes, based on the intra prediction mode being identified to correspond to the wide angle direction (620—Yes), obtaining a coefficient scanning direction based on the wide angle direction instead of the obtained index.

In a fourth block (640), the method (600) includes, based on the intra prediction mode being identified to not correspond to the wide angle direction (620—No), obtaining the coefficient scanning direction based on the obtained index, using a first look up table indicating a mapping between a plurality of indices of a plurality of intra prediction modes and respective coefficient scanning directions.

In a fifth block (650), the method (600) includes performing a coefficient scanning of the current block, based on the obtained coefficient scanning direction.

The identifying whether the intra prediction mode corresponds to the wide angle direction may include identifying whether the intra prediction mode corresponds to the wide angle direction, based on a parameter indicating whether the intra prediction mode corresponds to the wide angle direction.

In the first look up table, a first number of the plurality of indices mapped to a horizontal or vertical scanning direction may be larger than a second number of the plurality of indices mapped to a diagonal scanning direction.

The plurality of indices mapped to the horizontal or vertical scanning direction may be of one or more of the plurality of intra prediction modes that correspond to angular directions near top right and bottom left diagonal directions.

The coefficient scanning direction may be one among a horizontal scanning direction, a vertical scanning direction and a diagonal scanning direction.

Although FIG. 6 shows example blocks of the method (600), in some implementations, the method (600) may include additional blocks, fewer blocks, different blocks, or differently arranged blocks than those depicted in FIG. 6. Additionally, or alternatively, two or more of the blocks of the method (600) may be performed in parallel.

Figure 7:
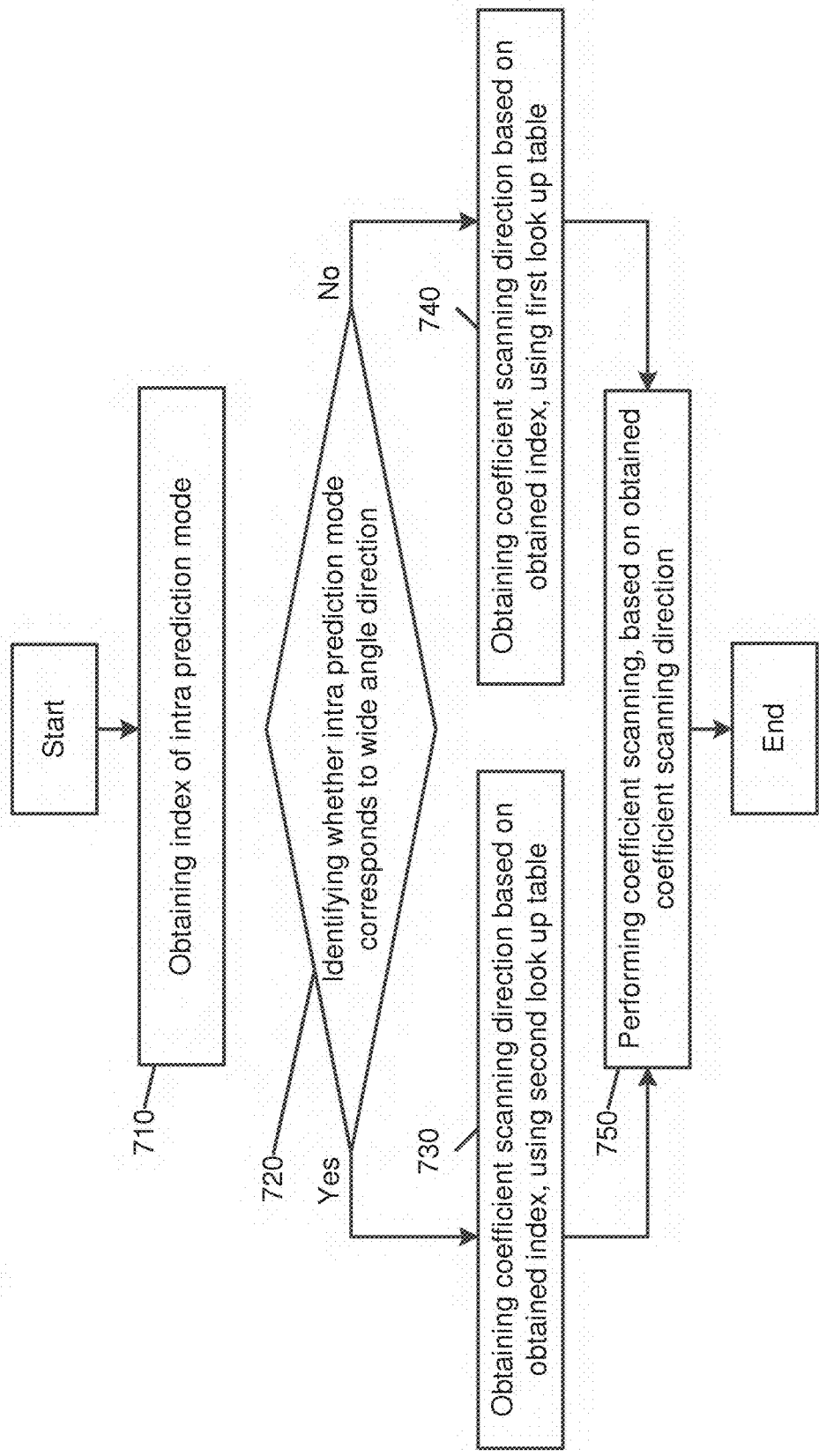
FIG. 7 is a flowchart illustrating a method of controlling intra prediction for decoding or encoding of a video sequence, according to embodiments.

FIG. 7 is a flowchart illustrating a method (700) of controlling intra prediction for decoding or encoding of a video sequence, according to embodiments. In some implementations, one or more process blocks of FIG. 7 may be performed by the decoder (310). In some implementations, one or more process blocks of FIG. 7 may be performed by another device or a group of devices separate from or including the decoder (310), such as the encoder (303).

Referring to FIG. 7, in a first block (710), the method (700) includes obtaining an index of an intra prediction mode of a current block of the video sequence.

In a second block (720), the method (700) includes identifying whether the intra prediction mode corresponds to a wide angle direction.

In a third block (730), the method (700) includes, based on the intra prediction mode being identified to correspond to the wide angle direction (720—Yes), obtaining a coefficient scanning direction based on the obtained index, using a second look up table indicating a mapping between a plurality of indices of wide angle modes and respective coefficient scanning directions.

In a fourth block (740), the method (700) includes, based on the intra prediction mode being identified to not correspond to the wide angle direction (720—No), obtaining the coefficient scanning direction based on the obtained index, using the first look up table.

In a fifth block (750), the method (700) includes performing a coefficient scanning of the current block, based on the obtained coefficient scanning direction.

The identifying whether the intra prediction mode corresponds to the wide angle direction may include identifying whether the intra prediction mode corresponds to the wide angle direction, based on a parameter indicating whether the intra prediction mode corresponds to the wide angle direction.

In the first look up table, a first number of the plurality of indices mapped to a horizontal or vertical scanning direction may be larger than a second number of the plurality of indices mapped to a diagonal scanning direction.

The plurality of indices mapped to the horizontal or vertical scanning direction may be of one or more of the plurality of intra prediction modes that correspond to angular directions near top right and bottom left diagonal directions.

The coefficient scanning direction may be one among a horizontal scanning direction, a vertical scanning direction and a diagonal scanning direction.

Although FIG. 7 shows example blocks of the method (700), in some implementations, the method (700) may include additional blocks, fewer blocks, different blocks, or differently arranged blocks than those depicted in FIG. 7. Additionally, or alternatively, two or more of the blocks of the method (700) may be performed in parallel.

Further, the proposed methods may be implemented by processing circuitry (e.g., one or more processors or one or more integrated circuits). In an example, the one or more processors execute a program that is stored in a non-transitory computer-readable medium to perform one or more of the proposed methods.

Figure 8:
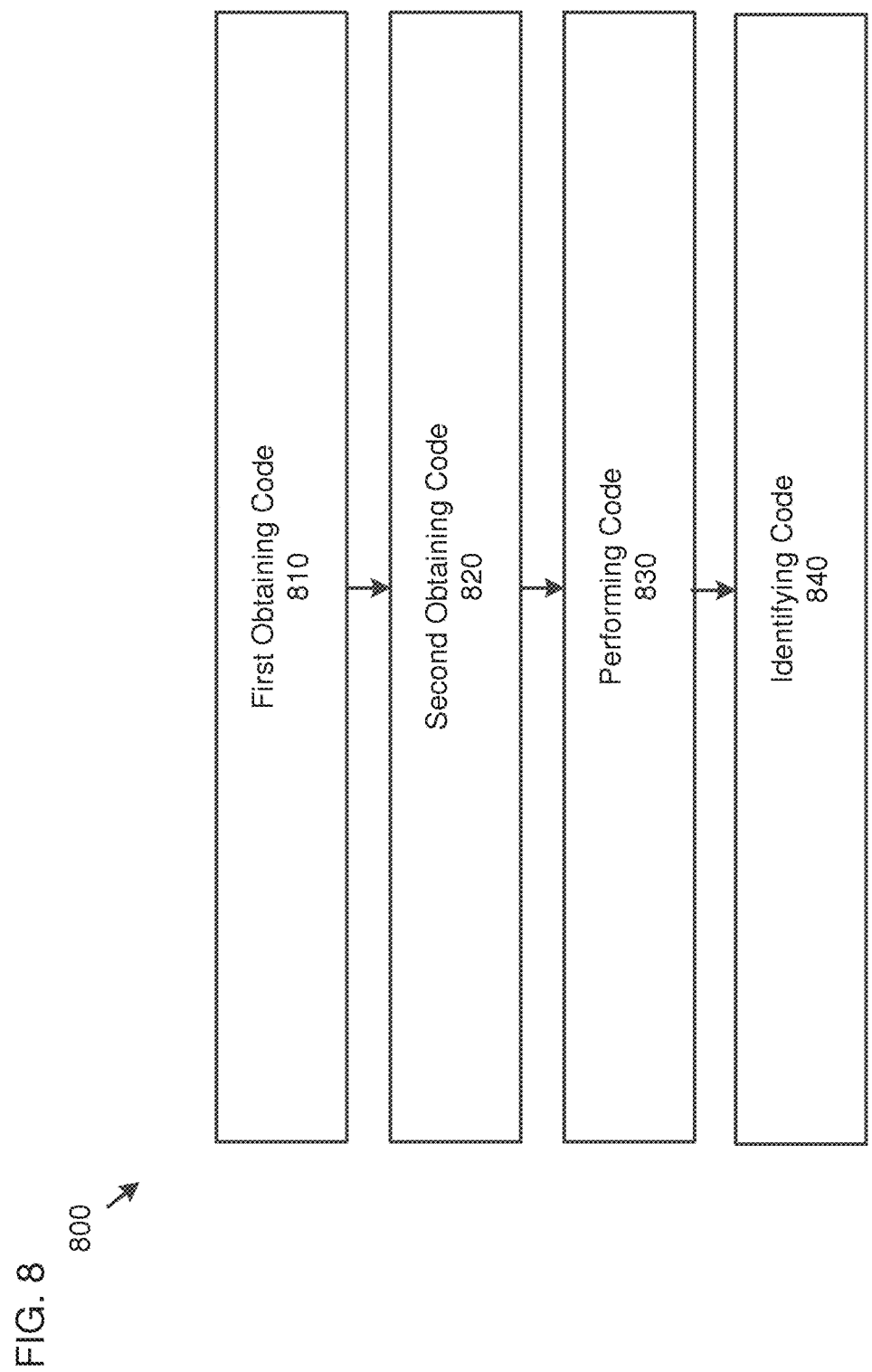
FIG. 8 is a simplified block diagram of an apparatus for controlling intra prediction for decoding or encoding of a video sequence, according to embodiments.

FIG. 8 is a simplified block diagram of an apparatus (800) for controlling intra prediction for decoding or encoding of a video sequence, according to embodiments.

Referring to FIG. 8, the apparatus (800) includes first obtaining code (810), second obtaining code (820), performing code (830) and identifying code (840).

The first obtaining code (810) is configured to cause the at least one processor to obtain an index of an intra prediction mode of a current block of the video sequence The second obtaining code (820) is configured to cause the at least one processor to obtain a coefficient scanning direction based on the obtained index, using a first look up table indicating a mapping between a plurality of indices of a plurality of intra prediction modes and respective coefficient scanning directions.

The performing code (830) is configured to cause the at least one processor to perform a coefficient scanning of the current block, based on the obtained coefficient scanning direction.

The identifying code (840) may be configured to cause the at least one processor to identify whether the intra prediction mode corresponds to a wide angle direction. The second obtaining code (820) may be further configured to cause the at least one processor to, based on the intra prediction mode being identified to correspond to the wide angle direction, obtain the coefficient scanning direction based on the wide angle direction instead of the obtained index, and based on the intra prediction mode being identified to not correspond to the wide angle direction, obtain the coefficient scanning direction based on the obtained index, using the first look up table.

The identifying code (840) may be configured to cause the at least one processor to identify whether the intra prediction mode corresponds to a wide angle direction. The second obtaining code (820) may be further configured to cause the at least one processor to, based on the intra prediction mode being identified to correspond to the wide angle direction, obtain the coefficient scanning direction based on the obtained index, using a second look up table indicating a mapping between a plurality of indices of wide angle modes and respective coefficient scanning directions, and based on the intra prediction mode being identified to not correspond to the wide angle direction, obtain the coefficient scanning direction based on the obtained index, using the first look up table.

The identifying code (840) may be further configured to cause the at least one processor to identify whether the intra prediction mode corresponds to the wide angle direction, based on a parameter indicating whether the intra prediction mode corresponds to the wide angle direction.

In the first look up table, a first number of the plurality of indices mapped to a horizontal or vertical scanning direction may be larger than a second number of the plurality of indices mapped to a diagonal scanning direction.

The plurality of indices mapped to the horizontal or vertical scanning direction may be of one or more of the plurality of intra prediction modes that correspond to angular directions near top right and bottom left diagonal directions.

The coefficient scanning direction may be one among a horizontal scanning direction, a vertical scanning direction and a diagonal scanning direction.

The techniques described above, can be implemented as computer software using computer-readable instructions and physically stored in one or more computer-readable media.

FIG. 9 is a diagram of a computer system (900) suitable for implementing embodiments.

The computer software can be coded using any suitable machine code or computer language, that may be subject to assembly, compilation, linking, or like mechanisms to create code comprising instructions that can be executed directly, or through interpretation, micro-code execution, and the like, by computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

The components shown in FIG. 9 for computer system (900) are examples in nature and are not intended to suggest any limitation as to the scope of use or functionality of the computer software implementing embodiments. Neither should the configuration of components be interpreted as having any dependency or requirement relating to any one or combination of components illustrated in the embodiment of a computer system (900).

Computer system (900) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (901), mouse (902), trackpad (903), touch screen (910), data-glove (904), joystick (905), microphone (906), scanner (907), camera (908).

Computer system (900) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (910), data-glove (904), or joystick (905), but there can also be tactile feedback devices that do not serve as input devices), audio output devices (such as: speakers (909), headphones (not depicted)), visual output devices (such as screens (910) to include cathode ray tube (CRT) screens, liquid-crystal display (LCD) screens, plasma screens, organic light-emitting diode (OLED) screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted). A graphics adapter (950) generates and outputs images to the touch-screen (910).

Computer system (900) can also include human accessible storage devices and their associated media such as optical media including CD/DVD ROM/RW (920) with CD/DVD or the like media (921), thumb-drive (922), removable hard drive or solid state drive (923), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (900) can also include interface(s) to one or more communication networks (955). Networks (955) can for example be wireless, wireline, optical. Networks (955) can further be local, wide-area, metropolitan, vehicular and industrial, real-time, delay-tolerant, and so on. Examples of networks (955) include local area networks such as Ethernet, wireless LANs, cellular networks to include global systems for mobile communications (GSM), third generation (3G), fourth generation (4G), fifth generation (5G), Long-Term Evolution (LTE), and the like, TV wireline or wireless wide area digital networks to include cable TV, satellite TV, and terrestrial broadcast TV, vehicular and industrial to include CANBus, and so forth. Certain networks (955) commonly require external network interface adapters that attached to certain general purpose data ports or peripheral buses ((949)) (such as, for example universal serial bus (USB) ports of the computer system (900); others are commonly integrated into the core of the computer system (900) by attachment to a system bus as described below (for example Ethernet interface into a PC computer system or cellular network interface (954) into a smartphone computer system). Using any of these networks (955), computer system (900) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks (955) and network interfaces (954) as described above.

Aforementioned human interface devices, human-accessible storage devices, and network interfaces (954) can be attached to a core (940) of the computer system (900).

The core (940) can include one or more Central Processing Units (CPU) (941), Graphics Processing Units (GPU) (942), specialized programmable processing units in the form of Field Programmable Gate Areas (FPGA) (943), hardware accelerators (944) for certain tasks, and so forth. These devices, along with Read-only memory (ROM) (945), Random-access memory (RAM) (946), internal mass storage such as internal non-user accessible hard drives, solid-state drives (SSDs), and the like (947), may be connected through a system bus (948). In some computer systems, the system bus (948) can be accessible in the form of one or more physical plugs to enable extensions by additional CPUs, GPU, and the like. The peripheral devices can be attached either directly to the core's system bus (948), or through a peripheral bus (949). Architectures for a peripheral bus include peripheral component interconnect (PCI), USB, and the like.

CPUs (941), GPUs (942), FPGAs (943), and accelerators (944) can execute certain instructions that, in combination, can make up the aforementioned computer code. That computer code can be stored in ROM (945) or RAM (946). Transitional data can also be stored in RAM (946), whereas permanent data can be stored for example, in the internal mass storage (947). Fast storage and retrieve to any of the memory devices can be enabled through the use of cache memory, that can be closely associated with one or more CPU (941), GPU (942), mass storage (947), ROM (945), RAM (946), and the like.

The computer readable media can have computer code thereon for performing various computer-implemented operations. The media and computer code can be those specially designed and constructed for the purposes of embodiments, or they can be of the kind well known and available to those having skill in the computer software arts.

As an example and not by way of limitation, the computer system having architecture (900), and specifically the core (940) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (940) that are of non-transitory nature, such as core-internal mass storage (947) or ROM (945). The software implementing various embodiments can be stored in such devices and executed by core (940). A computer-readable medium can include one or more memory devices or chips, according to particular needs. The software can cause the core (940) and specifically the processors therein (including CPU, GPU, FPGA, and the like) to execute particular processes or particular parts of particular processes described herein, including defining data structures stored in RAM (946) and modifying such data structures according to the processes defined by the software. In addition or as an alternative, the computer system can provide functionality as a result of logic hardwired or otherwise embodied in a circuit (for example: accelerator (944)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. Embodiments encompass any suitable combination of hardware and software.

While this disclosure has described several embodiments, there are alterations, permutations, and various substitute equivalents, which fall within the scope of the disclosure. It will thus be appreciated that those skilled in the art will be able to devise numerous systems and methods that, although not explicitly shown or described herein, embody the principles of the disclosure and are thus within the spirit and scope thereof.

The invention claimed is:

1. A method of controlling intra prediction for decoding or encoding of a video sequence, the method being performed by at least one processor, and the method comprising:
  obtaining an index of an intra prediction mode of a current block of the video sequence;
  obtaining a coefficient scanning direction based on the obtained index, using a first look up table indicating a mapping between a plurality of indices of a plurality of intra prediction modes and respective coefficient scanning directions,
  wherein, in the first look up table, a first number of the plurality of indices that is mapped to a horizontal or vertical scanning direction is larger than a second number of the plurality of indices that is mapped to a diagonal scanning direction,
  in the first look up table, the plurality of indices mapped to the diagonal scanning direction comprises multiple indices of multiple intra prediction modes respectively corresponding to bottom left, top left and top right diagonal directions, and in the first look up table, the plurality of indices mapped to the horizontal or vertical scanning direction does not comprise the multiple indices of the multiple intra prediction modes respectively corresponding to the bottom left, top left and top right diagonal directions; and performing a coefficient scanning of the current block, based on the obtained coefficient scanning direction.

2. The method of claim 1, further comprising:

identifying whether the intra prediction mode corresponds to a wide angle direction; and based on the intra prediction mode being identified to correspond to the wide angle direction, obtaining the coefficient scanning direction based on the wide angle direction instead of the obtained index, wherein the obtaining the coefficient scanning direction based on the obtained index comprises, based on the intra prediction mode being identified to not correspond to the wide angle direction, obtaining the coefficient scanning direction based on the obtained index, using the first look up table.

3. The method of claim 1, further comprising:

identifying whether the intra prediction mode corresponds to a wide angle direction; and based on the intra prediction mode being identified to correspond to the wide angle direction, obtaining the coefficient scanning direction based on the obtained index, using a second look up table indicating a mapping between a plurality of indices of wide angle modes and respective coefficient scanning directions, wherein the obtaining the coefficient scanning direction based on the obtained index comprises, based on the intra prediction mode being identified to not correspond to the wide angle direction, obtaining the coefficient scanning direction based on the obtained index, using the first look up table.

4. The method of claim 3, wherein the identifying whether the intra prediction mode corresponds to the wide angle direction comprises identifying whether the intra prediction mode corresponds to the wide angle direction, based on a parameter indicating whether the intra prediction mode corresponds to the wide angle direction.

5. The method of claim 1, wherein the coefficient scanning direction is one among a horizontal scanning direction, a vertical scanning direction and a diagonal scanning direction.

6. An apparatus for controlling intra prediction for decoding or encoding of a video sequence, the apparatus comprising:

at least one non-transitory memory configured to store computer program code; and at least one processor configured to access the at least one non-transitory memory and operate according to the computer program code, the computer program code comprising:

first obtaining code configured to cause the at least one processor to obtain an index of an intra prediction mode of a current block of the video sequence;

second obtaining code configured to cause the at least one processor to obtain a coefficient scanning direction based on the obtained index, using a first look up table indicating a mapping between a plurality of indices of a plurality of intra prediction modes and respective coefficient scanning directions, wherein, in the first look up table, a first number of the plurality of indices that is mapped to a horizontal or vertical scanning direction is larger than a second number of the plurality of indices that is mapped to a diagonal scanning direction, in the first look up table, the plurality of indices mapped to the diagonal scanning direction comprises multiple indices of multiple intra prediction modes respectively corresponding to bottom left, top left and top right diagonal directions, and in the first look up table, the plurality of indices mapped to the horizontal or vertical scanning direction does not comprise the multiple indices of the multiple intra prediction modes respectively corresponding to the bottom left, top left and top right diagonal directions; and performing code configured to cause the at least one processor to perform a coefficient scanning of the current block, based on the obtained coefficient scanning direction.

7. The apparatus of claim 6, further comprising identifying code configured to cause the at least one processor to identify whether the intra prediction mode corresponds to a wide angle direction, wherein the second obtaining code is further configured to cause the at least one processor to:

based on the intra prediction mode being identified to correspond to the wide angle direction, obtain the coefficient scanning direction based on the wide angle direction instead of the obtained index; and based on the intra prediction mode being identified to not correspond to the wide angle direction, obtain the coefficient scanning direction based on the obtained index, using the first look up table.

8. The apparatus of claim 6, further comprising identifying code configured to cause the at least one processor to identify whether the intra prediction mode corresponds to a wide angle direction, wherein the second obtaining code is further configured to cause the at least one processor to:

based on the intra prediction mode being identified to correspond to the wide angle direction, obtain the coefficient scanning direction based on the obtained index, using a second look up table indicating a mapping between a plurality of indices of wide angle modes and respective coefficient scanning directions; and based on the intra prediction mode being identified to not correspond to the wide angle direction, obtain the coefficient scanning direction based on the obtained index, using the first look up table.

9. The apparatus of claim 8, wherein the identifying code is further configured to cause the at least one processor to identify whether the intra prediction mode corresponds to the wide angle direction, based on a parameter indicating whether the intra prediction mode corresponds to the wide angle direction.

10. The apparatus of claim 6, wherein the coefficient scanning direction is one among a horizontal scanning direction, a vertical scanning direction and a diagonal scanning direction.

11. A non-transitory computer-readable storage medium storing instructions that cause at least one processor to:

obtain an index of an intra prediction mode of a current block of a video sequence;

obtain a coefficient scanning direction based on the obtained index, using a first look up table indicating a mapping between a plurality of indices of a plurality of intra prediction modes and respective coefficient scanning directions, wherein, in the first look up table, a first number of the plurality of indices that is mapped to a horizontal or vertical scanning direction is larger than a second number of the plurality of indices that is mapped to a diagonal scanning direction, in the first look up table, the plurality of indices mapped to the diagonal scanning direction comprises multiple indices of multiple intra prediction modes respectively corresponding to bottom left, top left and top right diagonal directions, and in the first look up table, the plurality of indices mapped to the horizontal or vertical scanning direction does not comprise the multiple indices of the multiple intra prediction modes respectively corresponding to the bottom left, top left and top right diagonal directions; and perform a coefficient scanning of the current block, based on the obtained coefficient scanning direction.

12. The non-transitory computer-readable storage medium of claim 11, wherein the instructions further cause the at least one processor to:
identify whether the intra prediction mode corresponds to a wide angle direction;
based on the intra prediction mode being identified to correspond to the wide angle direction, obtain the coefficient scanning direction based on the wide angle direction instead of the obtained index; and
based on the intra prediction mode being identified to not correspond to the wide angle direction, obtain the coefficient scanning direction based on the obtained index, using the first look up table.

13. The non-transitory computer-readable storage medium of claim 11, wherein the instructions further cause the at least one processor to:
identify whether the intra prediction mode corresponds to a wide angle direction;
based on the intra prediction mode being identified to correspond to the wide angle direction, obtain the coefficient scanning direction based on the obtained index, using a second look up table indicating a mapping between a plurality of indices of wide angle modes and respective coefficient scanning directions; and
based on the intra prediction mode being identified to not correspond to the wide angle direction, obtain the coefficient scanning direction based on the obtained index, using the first look up table.

14. The non-transitory computer-readable storage medium of claim 13, wherein the instructions further cause the at least one processor to identify whether the intra prediction mode corresponds to the wide angle direction, based on a parameter indicating whether the intra prediction mode corresponds to the wide angle direction.

15. The method of claim 1, wherein the first look up table comprises:
{X, X, DIA, DIA, DIA, DIA, HOR, HOR, HOR, HOR, HOR, HOR, HOR, HOR, HOR, HOR, HOR, HOR, HOR, HOR, HOR, HOR, HOR, HOR, HOR, HOR, HOR, HOR, HOR, HOR, HOR, DIA, DIA, DIA, DIA, DIA, DIA, DIA, VER, VER, VER, VER, VER, VER, VER, VER, VER, VER, VER, VER, VER, VER, VER, VER, VER, VER, VER, VER, VER, VER, VER, VER, VER, DIA, DIA, DIA, DIA},
where X indicates a variable scanning direction, DIA indicates the diagonal scanning direction, HOR indicates a horizontal scanning direction and VER indicates a vertical scanning direction.

* * * * *